(12) United States Patent
Medernach

(10) Patent No.: US 7,673,571 B2
(45) Date of Patent: Mar. 9, 2010

(54) DRILL DISC OPENER

(75) Inventor: Ashley M Medernach, Cudworth (CA)

(73) Assignee: CNH Canada, Ltd., Saskatoon, SK (CA)

( * ) Notice: Subject to any disclaimer, the term of this patent is extended or adjusted under 35 U.S.C. 154(b) by 146 days.

(21) Appl. No.: 11/749,380

(22) Filed: May 16, 2007

(65) Prior Publication Data
US 2008/0282950 A1 Nov. 20, 2008

(51) Int. Cl.
A01C 5/00 (2006.01)
A01C 7/00 (2006.01)
A01C 9/00 (2006.01)
A01C 13/00 (2006.01)
A01C 23/00 (2006.01)

(52) U.S. Cl. .............. 111/121; 111/136; 111/165; 111/167; 111/187; 111/188; 111/194; 111/926; 172/566; 172/604; 172/610

(58) Field of Classification Search ........... 111/186, 111/192, 194, 120, 121, 149, 157, 163, 167, 111/187, 188, 164, 165, 190, 14, 52, 62, 111/134–137, 926; 172/558, 566, 604, 606, 172/610
See application file for complete search history.

(56) References Cited

U.S. PATENT DOCUMENTS

| 2,691,353 | A | 10/1954 | Secondo |
| 2,920,587 | A | 1/1960 | Shriver |
| 4,646,663 | A | 3/1987 | Nikkel et al. |
| 4,932,340 | A | 6/1990 | Benzel |
| 5,431,232 | A | 7/1995 | Kirsch |
| 5,473,999 | A | 12/1995 | Rawson et al. |
| 5,752,453 | A | 5/1998 | Nikkel et al. |
| 6,032,593 | A | 3/2000 | Wendling et al. |
| 6,216,616 | B1 | 4/2001 | Bourgault |

*Primary Examiner*—Christopher J. Novosad
(74) *Attorney, Agent, or Firm*—Rebecac L. Henkel; John William Stader

(57) ABSTRACT

The present planter unit, and planter implements using the present planter unit, include first and second discs and first and second pathways. The first and second discs may be generally planar and in a non-overlapping relation. As the planter unit is towed through a field, the first disc creates a first trench in the seedbed and the first pathway deposits a first material in the first trench. Subsequently, the second disc creates a second trench which is continuous with the first trench and partially fills the first trench. A second material is deposited in the second trench by the second pathway.

18 Claims, 9 Drawing Sheets

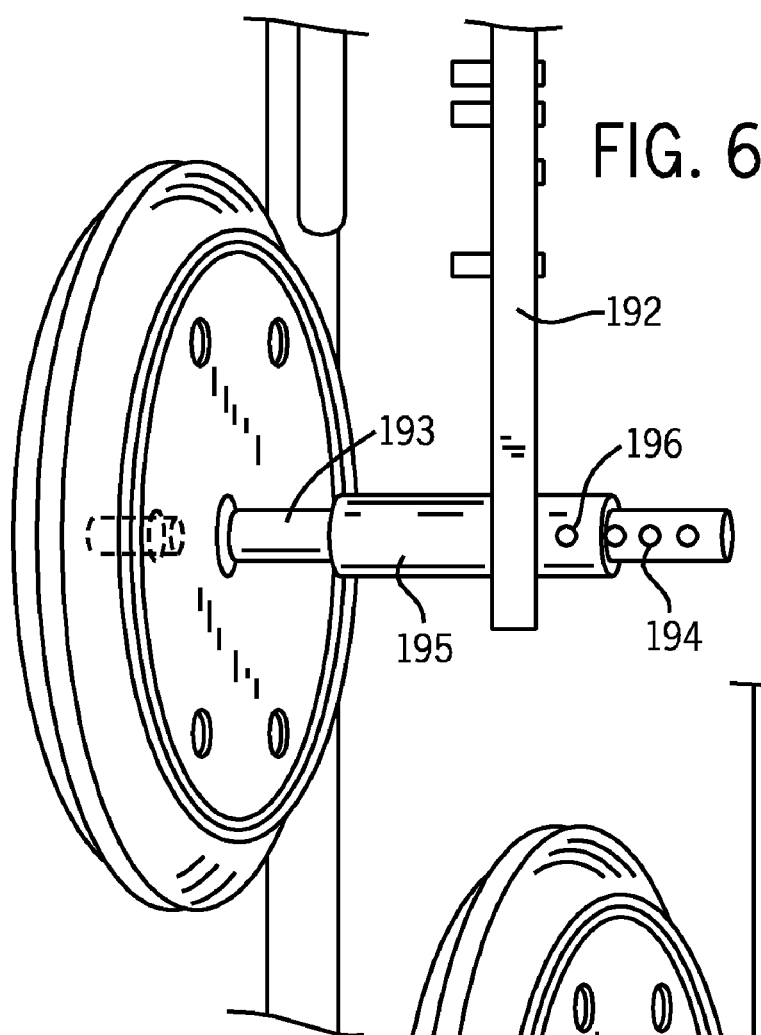
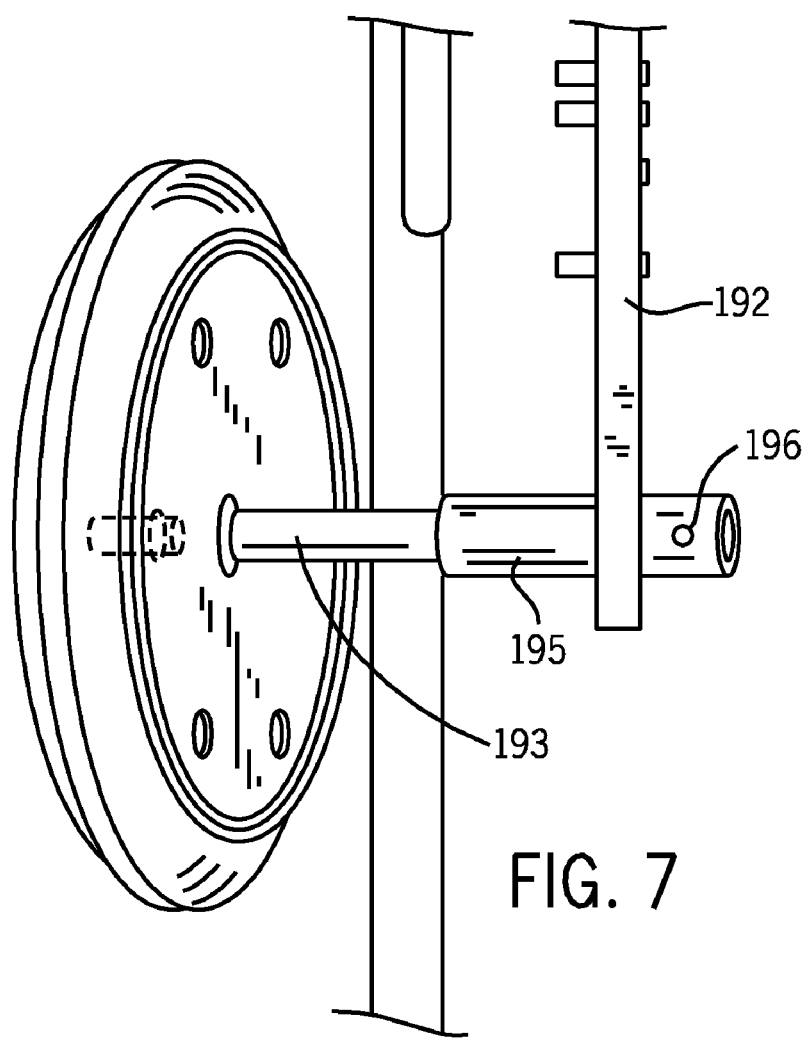

DRILL DISC OPENER

FIELD OF THE INVENTION

This invention relates to seeding implements and, in particular, this invention relates to implements suitable for simultaneous seeding and applying a second substance under cultural regimes which reduce or eliminate tillage or seedbed preparation.

BACKGROUND OF THE INVENTION

When crops are harvested, much of the above-ground portion of the crop plants—termed the crop residue—is left above the soil surface. Traditional farming methods have included incorporating the crop residue into the soil before seeding the next crop. However, incorporating the crop residue leaves the soil surface bare and exposed to wind and water erosion. By contrast, reduced or eliminated tillage regimes leave all or a significant portion of the crop residue on the soil surface. The presence of the crop residue on the soil surface eliminates much of the erosion, which would otherwise occur if the soil was left exposed. In contrast to equipment used for traditional seeding, equipment for seeding into soils protected by reduced or eliminated tillage regimes must penetrate through the crop residue and into soils which are often more highly compacted than soils under traditional tillage regimes. Therefore, the equipment is usually heavier and made from components designed to withstand the additional stresses encountered when crop residue and more highly compacted soils are penetrated. Additionally, other materials such as fertilizers, herbicides, and pesticides must be placed adjacent the seed. In the case of fertilizers, the fertilizer materials must be placed adjacent the seed, but must be disposed sufficiently distant from the seed so that emerging seedlings are not damaged by high fertilizer concentrations in the soil water solution. While being sufficiently distant from the emerging seedlings, the fertilizer materials must also be sufficiently close to the emerging seedlings, so that non-injurious plant nutrient solution concentrations from the fertilizer materials are available to the crop plants shortly after germination and during emergence.

There is then a need for planters which effectively penetrate above-ground crop residues and more highly compacted soils during seeding operations. There is a particular need for planters, which effectively penetrate above-ground crop residues and more compacted soils and which also dispense additional materials at effective and safe locations in the soil profile.

SUMMARY OF THE INVENTION

This invention substantially meets the aforementioned needs of the industry by providing a planting unit which effectively penetrates above-ground crop residues and more highly compacted soils and which dispenses additional materials at effective and safe locations in the soil profile.

To this end a planter unit and method for applying a first material and a second material into a soil are provided, the planter unit including first and second discs and first and second paths. The first disc may be angularly disposed with respect to a direction of travel, in mechanical communication with a toolbar, and operatively open a first trench in the soil. The second disc may be disposed in a non-overlapping relation with respect to the first disc and may be positioned to open a second trench in the soil. The second trench may be disposed laterally and above the first trench bottom and may open into the first trench. The first pathway may convey a first material, such as fertilizer, a pesticide, or an herbicide, to proximate a bottom of the first trench. The second pathway may convey a second material, such as a crop seed, to proximate a bottom of the second trench. The second disc may be disposed so as to partially fill a portion of the first trench when forming the second trench and the second trench may be disposed laterally and above the first trench bottom portion. The second pathway may convey the second material to a position proximate a bottom portion of the second trench.

There is also provided a planter unit and method for conveying a first material and a second material into a seedbed. The planter unit may include a generally planar first disc, a first pathway, a generally planar second disc, a second pathway, and a filling and packing or firming structure. The first disc may be disposed so as to form a first trench in the seedbed. The first pathway may convey a first material proximate a bottom portion of the first trench. The structure for at least partially filling the first and second trenches with soil and compacting the filled first and second trenches may include a wheel trailing the first and second discs.

It is a feature of the instant planting unit to include first and second discs in a non-overlapping relation.

It is an advantage of the foregoing feature that the first and second discs are more accessible to maintenance and repair than if disposed in an overlapping relation.

It is another advantage of the foregoing feature that trenches are more consistently formed in desired conformations than if overlapping first and second discs are present.

It is another feature of the present invention that the first and second discs may be generally planar.

It is an advantage of the foregoing feature that the generally planar first and second discs are more easily cleaned and kept free of soil and crop residue than discs with convex features.

It is another advantage of the foregoing feature that the generally planar first and second discs are more effective in forming desired trenches with acceptable depths and geometries.

It is yet another feature that the generally planar first and second discs may displace soil with a lower velocity than discs with concave geometries.

It is an advantage of the foregoing feature that the lower velocity of displacement results in a lower degree of soil displacement when the trenches are formed, thereby disturbing the soil profile to a minimum extent.

It is still yet another feature that the instant planter unit includes a second disc and a second pathway.

It is an advantage of the foregoing feature that simultaneous seeding and dispensing of a second essential material can be effected.

These and other objects, features, and advantages of this invention will become apparent from the description which follows, when considered in view of the accompanying drawings.

BRIEF DESCRIPTION OF THE DRAWINGS

FIGS. 6 and 7 are perspective views of an alternate embodiment of the packer wheel of FIG. 2;

Figure 1:
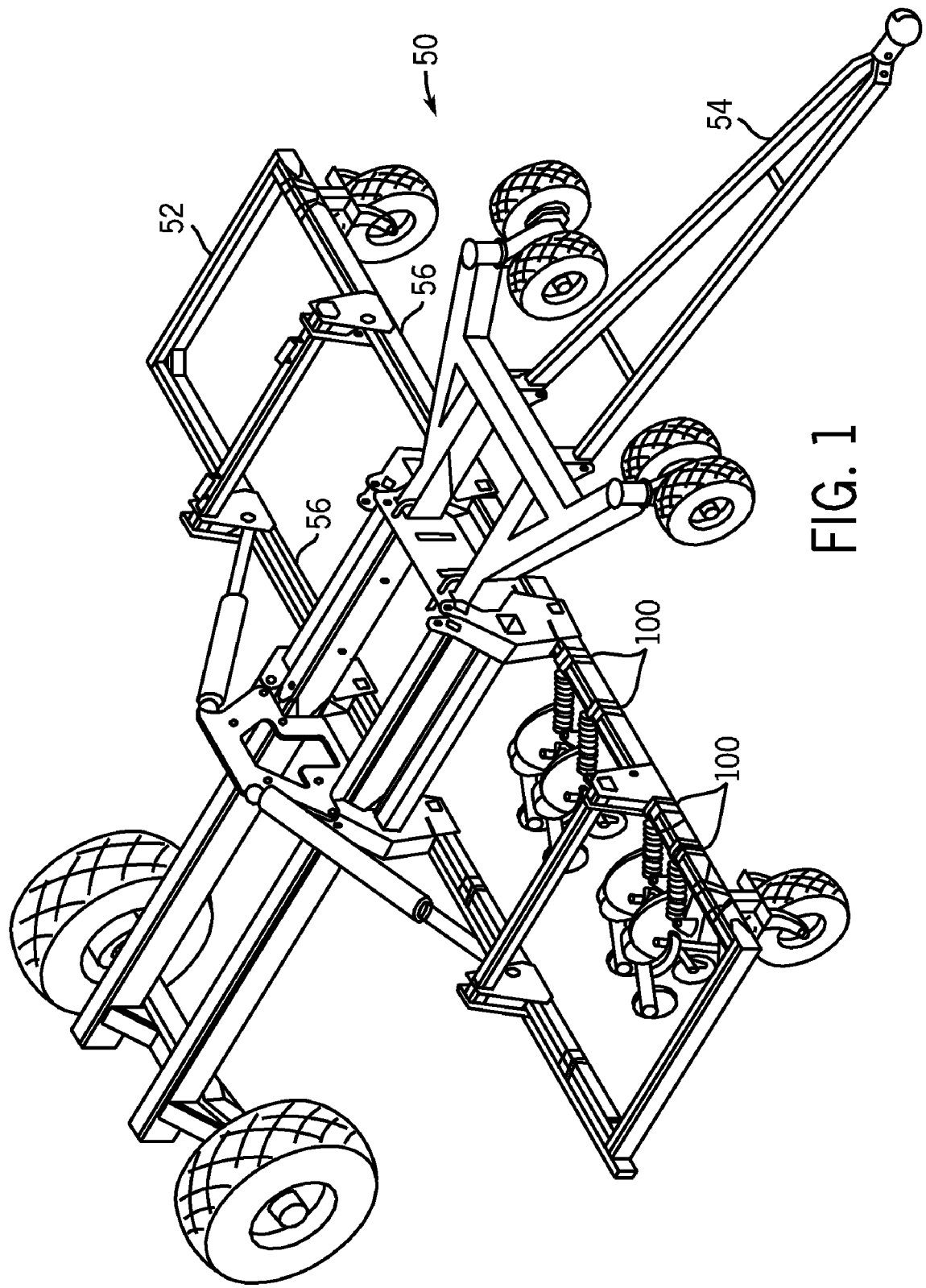
FIG. 1 is a perspective view of an exemplary planter or drill with a plurality of the planter units of this invention attached.

It is understood that the above-described figures are only illustrative of the present invention and are not contemplated to limit the scope thereof.

DETAILED DESCRIPTION

Any references to such relative terms as front and back, right and left, top and bottom, upper and lower, horizontal and vertical, or the like, are intended for convenience of description and are not intended to limit the present invention or its components to any one positional or spatial orientation. All dimensions of the components in the attached figures may vary with a potential design and the intended use of an embodiment of the invention without departing from the scope of the invention. Each of the additional features and methods disclosed herein may be utilized separately or in conjunction with other features and methods to provide improved connectors and methods for making the same. This detailed description is merely intended to teach a person of ordinary skill in the art further details for practicing preferred aspects of the present teachings and is not intended to limit the scope of the invention. Therefore, only combinations of features and methods disclosed in the following detailed description may not be necessary to practice the invention in the broadest sense, and are instead taught merely to particularly describe representative and preferred embodiments of the invention.

The present invention includes an assembly such as a planter unit for placing a first material and a second material in a seedbed. The first material may be a fertilizer, pesticide, or the like, or any mixture thereof. The second material may be crop seeds. The first material is deposited in a first trench defined in a seedbed by a first disc. The second material is deposited in a second trench defined in the seedbed proximate the first trench. The second trench may be lateral to, and above, the first trench. The instant planter unit may advantageously replace a disc opener assembly, such as disclosed in U.S. Pat. No. 6,032,593 or as disclosed in U.S. Pat. No. 6,386,127 (published as U.S. Patent Application Publication No. 2002/0166,486 A1), each hereby incorporated by reference.

U.S. Pat. No. 6,032,593, filed 27 Apr. 1998 and issued 7 Mar. 2000, discloses a grain drill opener with separate placement discs for seeding and dispensing a second material, the two discs in an overlapping relation. The implement is described as a combination seed and fertilizer opener having separate placement effected by a first angled flat disc and a second concave opener disc. The first disc provides an initial furrow for the first material. The second opener disc is used to open a trench for the seed, is smaller than the first opener disc and is concave rather than flat. The second opener disc includes an edge, which projects forwardly along the trailing side of the first disc to a forwardmost edge location adjacent the hub of the first disc.

U.S. Pat. No. 6,386,127 discloses a single disc opener assembly for a seed planter. The single disc opener is generally planar. While the assembly has been effective for seeding in reduced tillage regimes, it cannot apply a second material such as fertilizer during a single pass.

An embodiment of the seeding implement of the present invention, termed a seeder or drill, is depicted in FIG. 1 generally at 50. The seeder 50 includes a frame 52 and a drawbar 54 pivotally attached to the frame 52. The drawbar 54 attaches to a prime mover, such as a tractor, which provides power and hydraulic fluids to pull and operate the seeder 50. The frame includes one or more toolbars 56, to which are attached one or more of the instant drill disc opener assemblies or planter units 100. In one embodiment, the seeder 50 is a single component of a seeding system for reduced or eliminated tillage regimes. To this end, a separate tank containing seed (not shown) is towed by the tractor. The present seeder 50, in turn, is towed behind the separate tank. An air delivery system supplies seed to the instant planter units from the tank. In one embodiment, a first air delivery assembly conveys seed from the tank to a manifold on the seeder 50 and a second air delivery assembly conveys seed from the manifold to each of the instant planter units. Additional tanks may be used as well to carry materials such as fertilizer, pesticides, or the like to be applied during seeding. These additional tanks may be independently mounted on wheeled chassis, may be separate compartments of the implement holding the seed to be planted, or may be mounted on the seeder 50 or the tractor.

Figure 2:
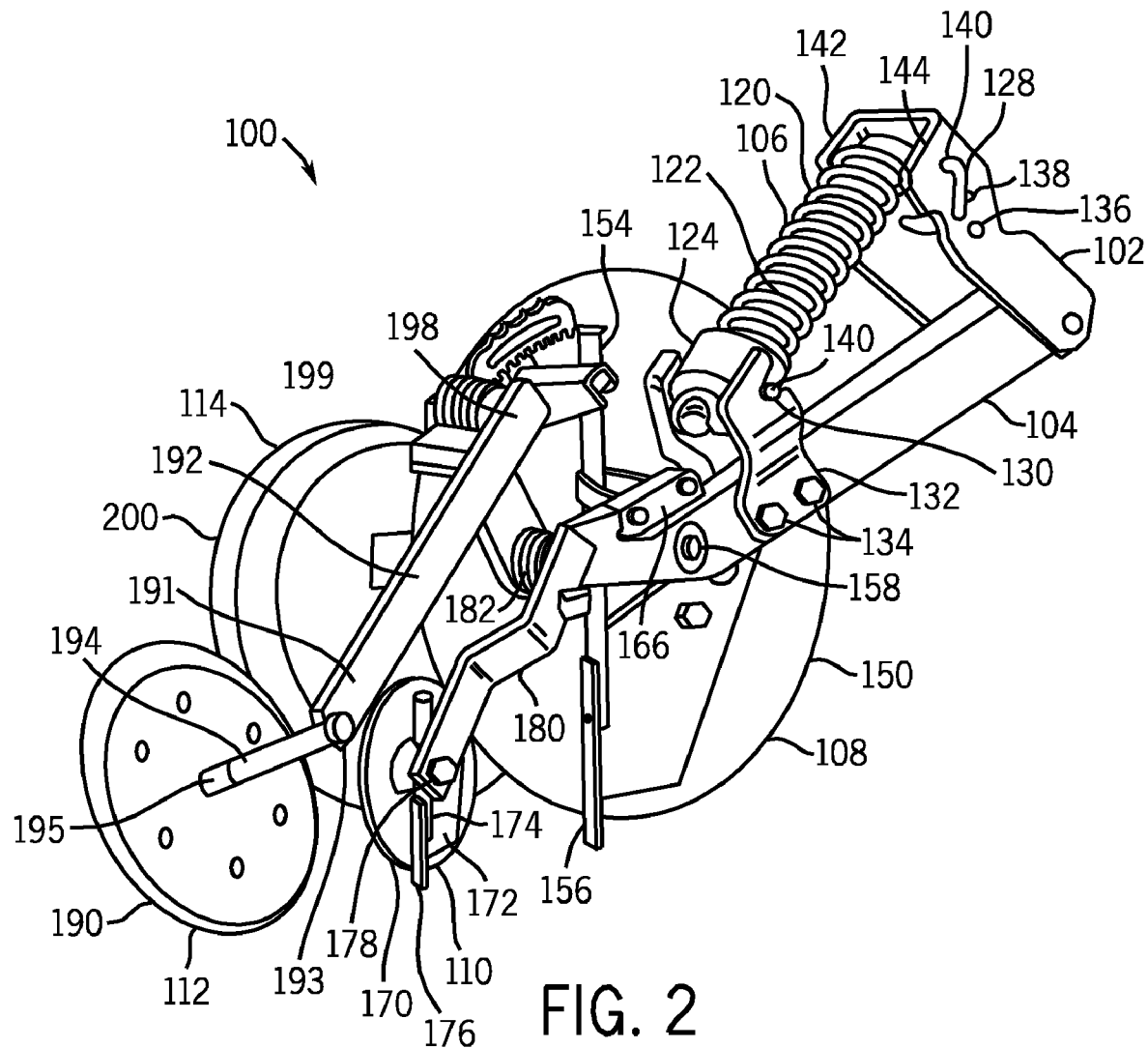
FIG. 2 is a perspective view of one embodiment of the planter unit of this invention.

One embodiment of the present planter unit is depicted in FIG. 2 at 100 and includes a bracket 102, a drawbar 104, a pressure adjusting mechanism 106, a first disc assembly 108, a second disc assembly 110, an optional packer assembly 112, and a depth adjustment mechanism 114.

The bracket 102 is attached to the drawbar 54 (shown in FIG. 1) by a connector, such as a U-bolt or the like. The drawbar 104 and pressure adjusting mechanism 106 are both attached to the bracket 102. The pressure adjusting mechanism 106, in turn, includes a compression spring 120, a compression element 122 operably disposed within the compression spring 120, a retainer element 124, a retainer pin 126, and an adjustment pin 128. The compression spring 120 is retained between the bracket 102 and the retainer element 124. The retainer element 124 is secured in place by the force exerted by the compression spring 120 against the retainer pin 126 when the retainer pin 126 is disposed in a slot 130 of a bracket 132. The bracket 132, in turn, is secured to the drawbar 104 by fasteners, such as bolts 134. Downward pressure exerted by the instant pressure adjusting mechanism can be adjusted by disposing the adjusting pin 128 in one of hole pairs 136, 138, or 140. The hole pairs 136, 138, and 140 are formed in lateral sections 142 and 144 of the bracket 102, respectively. In a specific embodiment, a downward pressure of between about 250-375 pounds is exerted on the drawbar 104 when the adjusting pin 128 is disposed in hole pair 136; a downward pressure of between about 300-450 pounds is exerted when the adjusting pin 128 is disposed in hole pair 138; and a downward pressure of between about 400-510 pounds is exerted when the adjusting pin 128 is disposed in hole pair 140. Adjusting the downward pressure in this matter is advantageous in that the instant planter unit is intended to be suitable for penetrating varying amounts of crop residue and a wide range of soil conditions. Larger amounts of crop residue and the type of crop residue will, in part, dictate the choice of downward pressure setting. Another consideration for the choice of downward pressure setting is the soil type and amount of soil compaction present in the seedbed. Relatively heavy soil types, e.g., clays, and high degrees of compaction require more downward pressures. Yet another consideration is that higher amounts of downward pressure require more energy when seeding is conducted.

Figure 3:
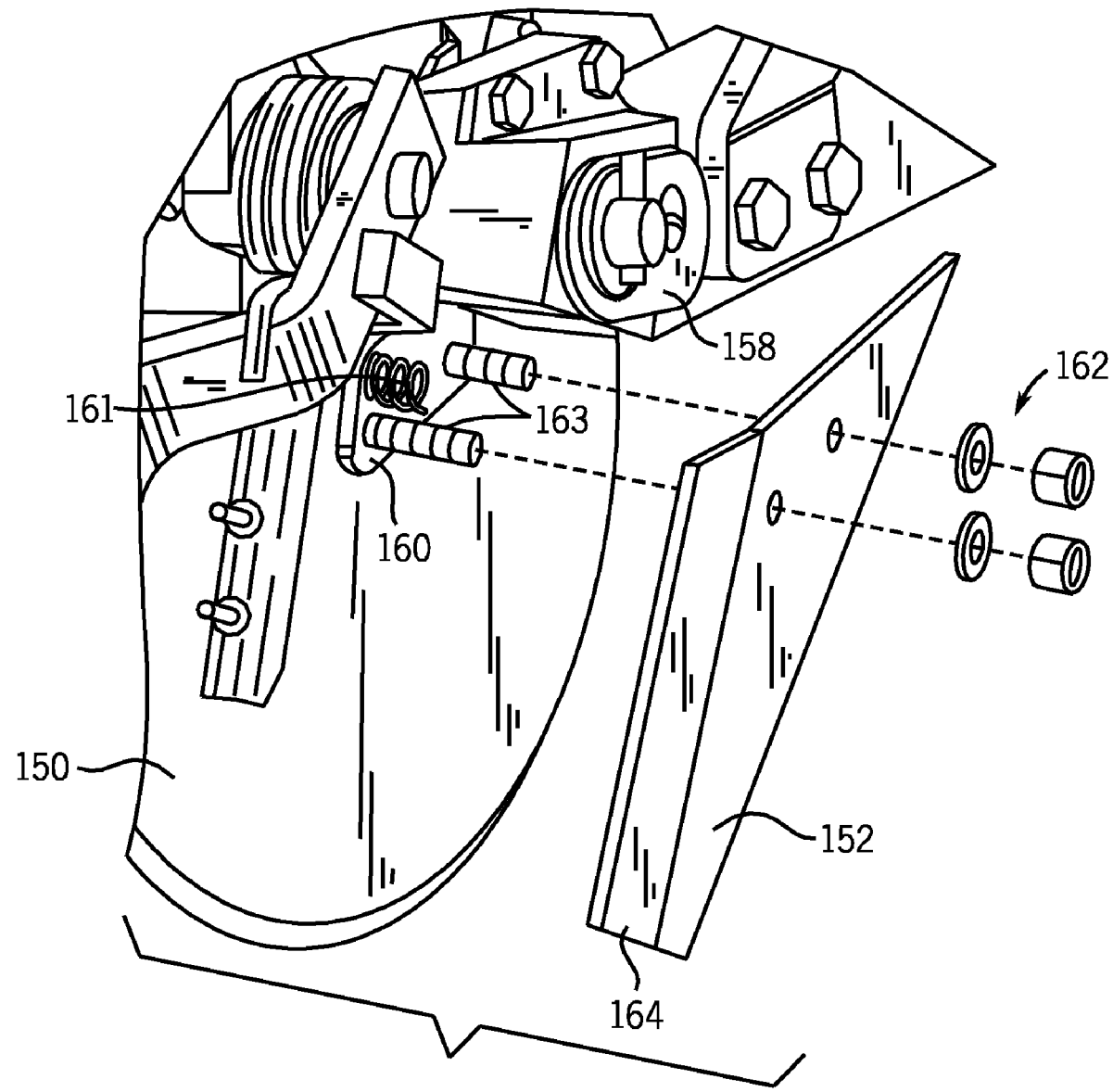
FIG. 3 is a partial, exploded view of the planter unit of FIG. 2, depicting a mounted first disc and scraper.
Figure 4:
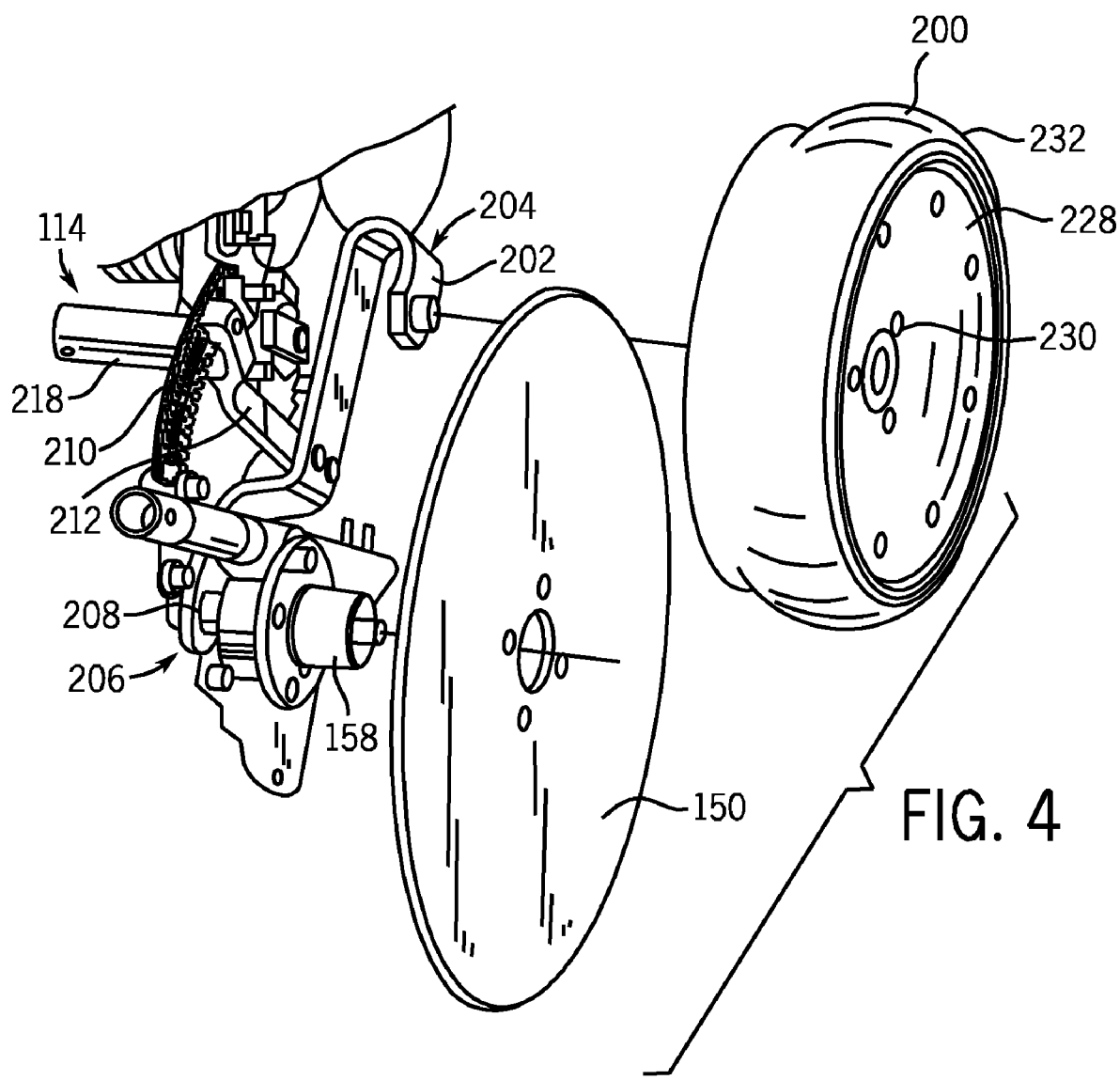
FIG. 4 is a partial, exploded view of the planter unit of FIG. 2, depicting the first disc, gauge wheel, and depth adjusting system.

Referring to FIGS. 2, 3 and 4, the first disc assembly 108 includes a first disc 150, a scraper 152, a first pathway such as a tube 154, a seed deflector mechanism such as a tab 156, and an axle element such as a bearing assembly 158. The disc 150 may be generally planar. A diameter of between about 15 and 30 inches or about 22.5 inches has been suitable for seeding where soil bed preparation has been reduced or eliminated. However a person of ordinary skill in the art may alter the diameter of the first disc 150 to form a desired initial trench depth or cross-sectional dimension or to accommodate specific soil types and amounts of surface crop residue. The first disc 150 is in mechanical communication with the drawbar 104, is disposed at a compound angle with respect thereto, and rotates by means of the bearing assembly 158. In one embodiment, the first disc 150 is disposed at an angle from the vertical (tilt angle) of between about 0 and 15 degrees or about 0 degrees and at an acute angle to the forward direction (steering angle) of between about 0 and 10 degrees or about 7 degrees. The tilt angle and the steering angle are adjusted to define the cross sectional dimension of the trench being formed during use. The tilt and/or steering angles may be in opposite directions in individual units to eliminate the lateral forces otherwise generated on the seeder 50 if the tilt and steering angles were unidirectional.

The scraper 152 is attached to the drawbar 104 by a scraper mount 160. A compression spring 161 cooperates with the scraper mount 160 to allow the scraper 152 to pivot and align with the disc 150. The scraper 152 is attached, and the compression of the spring 161 is maintained, by attaching connectors such as nuts 162 to threaded elements 163. As the edge of the scraper 152 is worn down, the spring 161 continues to press the scraper 152 against the disc 150 without additional adjustment. In addition to freeing the disc 150 of debris such as soil and crop residue, the scraper 152 protects the tube 154 and functions in creating the first trench. The scraper 152 may include an angled portion 164. If present the angled portion 164 may cooperate with the first disc 150 in creating a first trench by further displacing soil away from the first disc 150 during operation.

Figure 5:
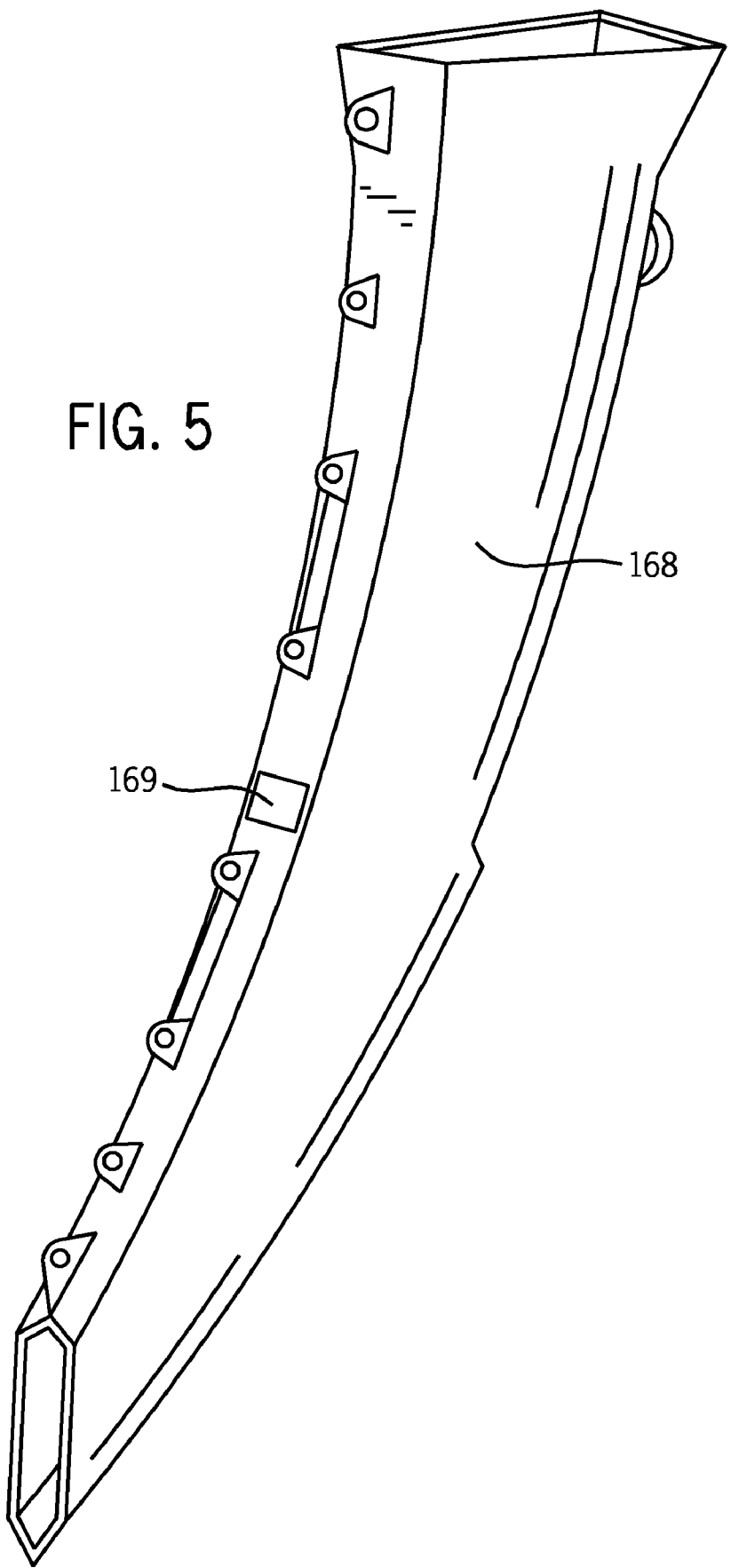
FIG. 5 is a perspective view of an alternate embodiment of the tube shown in FIG. 2.
Figure 8:
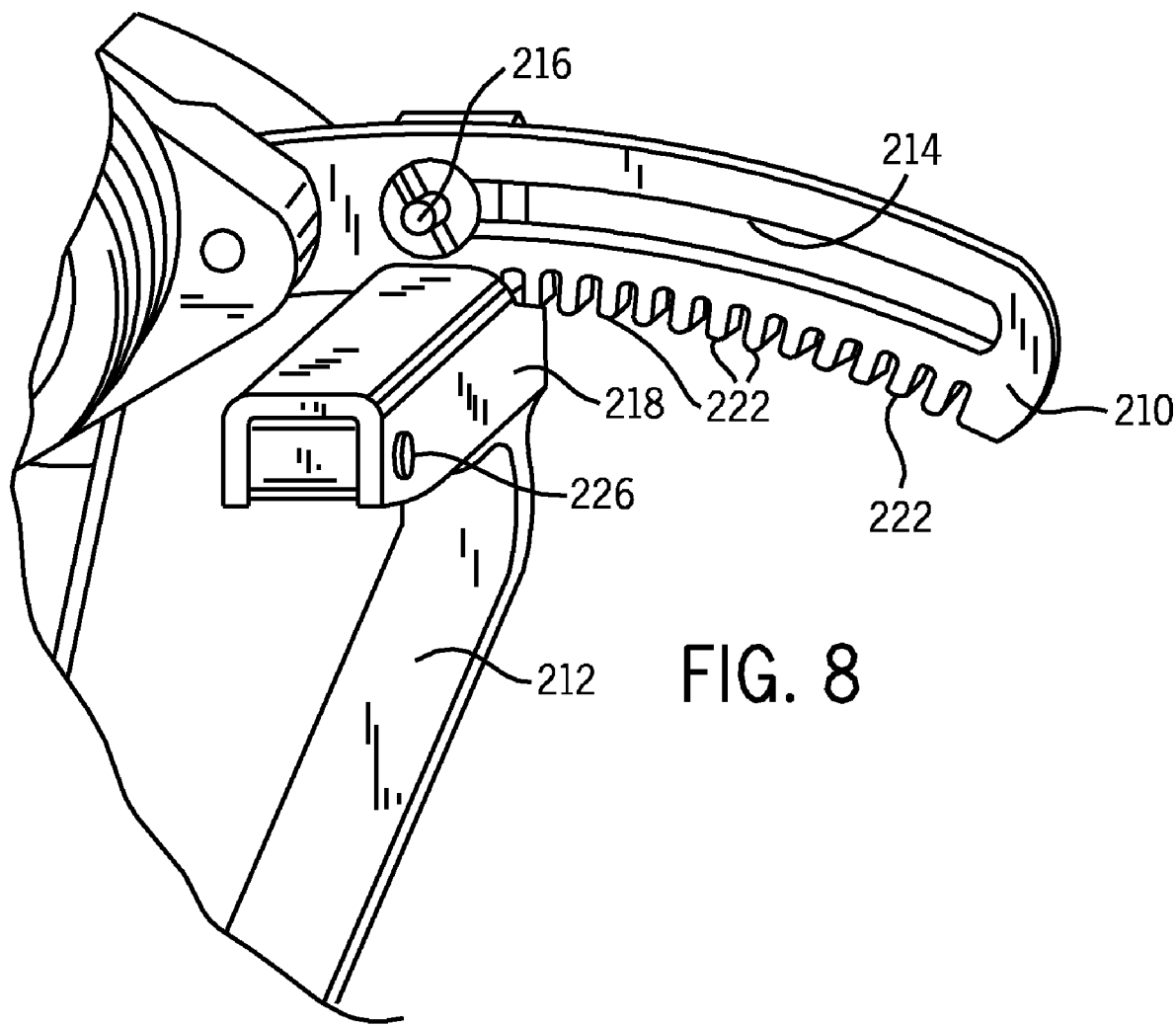
FIGS. 8 and 9 are perspective views of the depth adjusting mechanism of the planter unit of FIG. 2.
Figure 9:
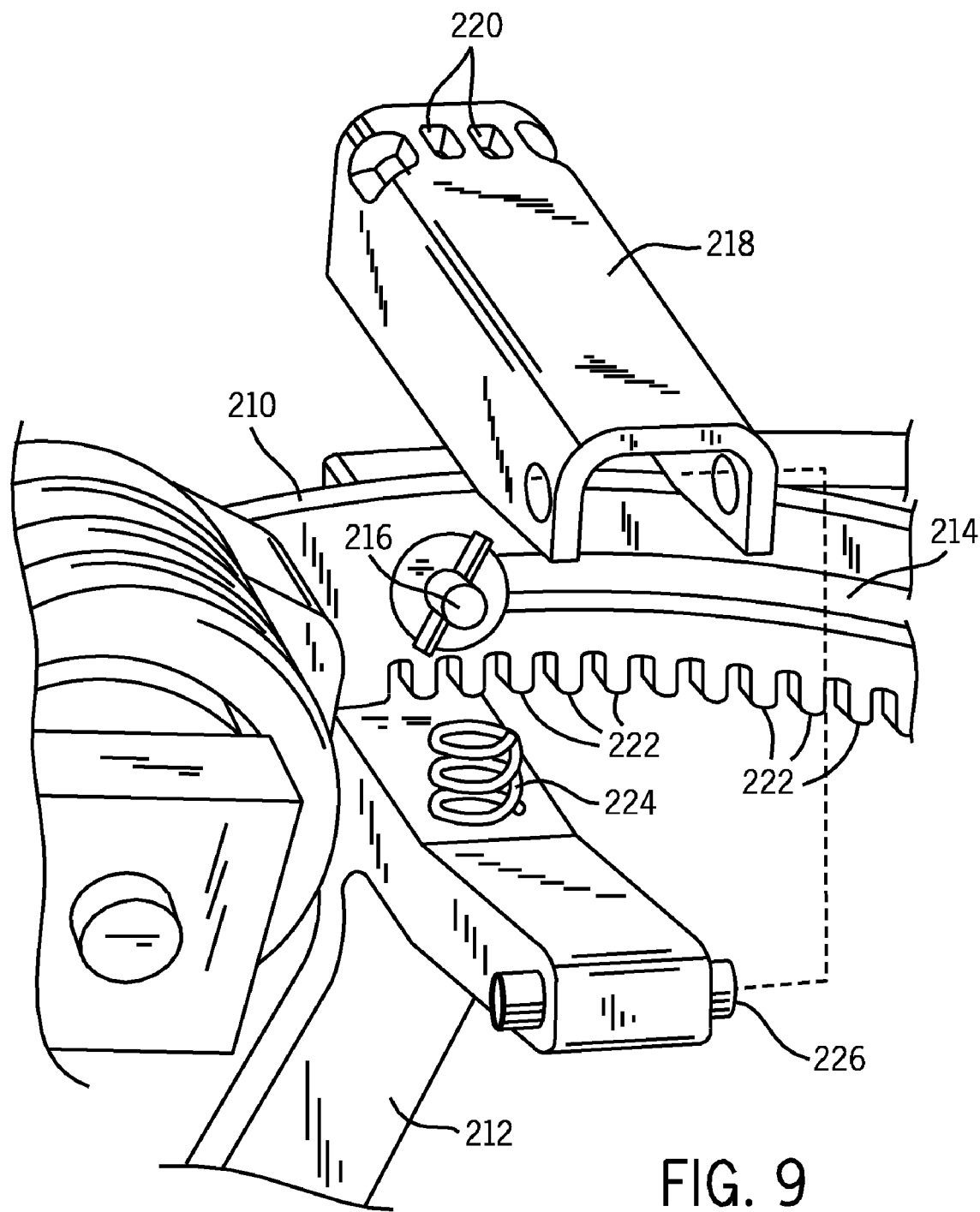
Figure 10:
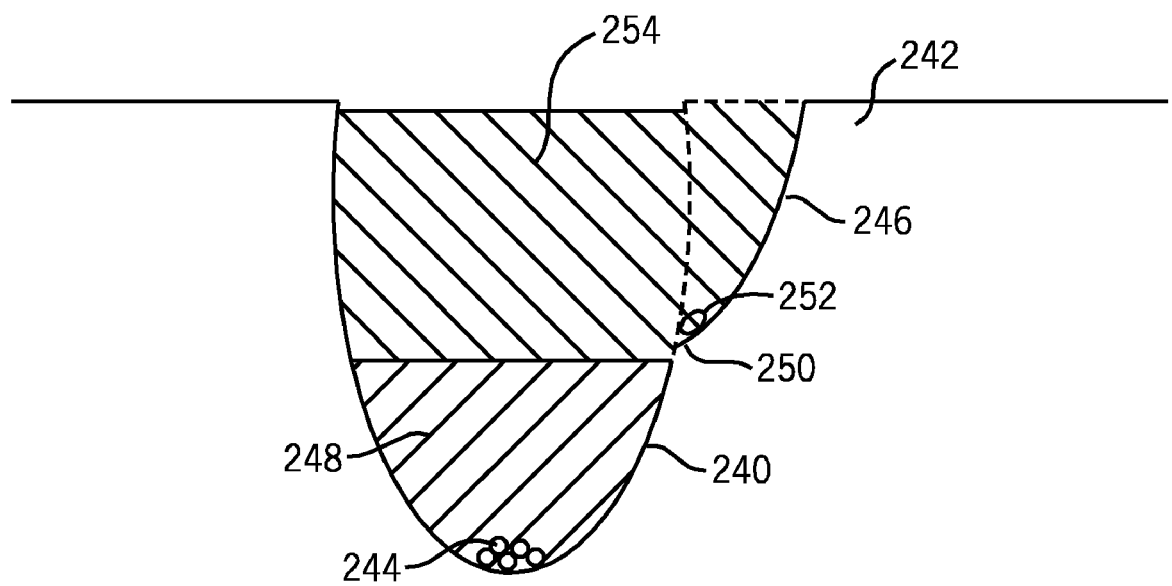
FIG. 10 is a cross sectional view of a first trench and second trench created by the present planter unit and suitable placement positions of materials deposited therein.

A first pathway, such as the tube 154, is attached to the drawbar 104 by a bracket 166, or some other suitable structure. The tube 154 conveys materials, such as fertilizer, a herbicide, a pesticide, or a mixture thereof to the first trench formed by the first disc 150. The materials conveyed can be solid (e.g., granular), liquid, or gaseous in nature. Depending upon the state of matter of the materials and anticipated quantity of materials to be conveyed, a person of ordinary skill in the art will readily comprehend that the tube 154 may be extended, shortened, or altered in cross sectional form (e.g., circular, square, rectangular) and dimension. One variant of the instant first pathway is depicted in FIG. 5 as tube 168. The tube 168 is generally crescent shaped and contains a port 169. Equipment known to persons of ordinary skill in the art may be advantageously present to monitor the amount and rate of materials being dispensed via the port 169. Suitable monitoring equipment is disclosed in U.S. Pat. No. 6,024,035 (to Flamme), U.S. Pat. No. 6,091,997 (to Flamme et al.), U.S. Pat. No. 6,009,354 (to Flamme et al.), and U.S. Pat. No. 5,956,255 (to Flamme), each of the foregoing patents assigned to the assignee of the present invention and hereby incorporated by reference.

With reference again to FIG. 2, the second disc assembly 110 includes a second disc 170, an optional scraper 172, a second pathway such as a tube 174, a seed deflector mechanism such as a tab 176, a bearing assembly 178, and an arm 180. In the embodiment depicted, the second disc 170 is generally planar and is between about 8 and 16 inches, or about 12 inches in diameter. However and for reasons discussed above, the diameter of the second disc may be altered. The scraper 172 and tube 174 are attached to the arm 180 by mechanisms such as that described with respect to the above-described scraper mount 160. The present second disc 170 may be mounted at a compound angle with respect to the direction of travel during use, the compound angle including a steering angle and a tilt angle. The steering angle may be between about 0 and 10 degrees, or about 0 degrees and the tilt angle may be between about 0 and five degrees. In one embodiment, the second disc 170 is advantageously disposed in a non-overlapping relation to the first disc 150. The non-overlapping spacing provides easier access to the components of the present planter unit and may advantageously allow soil to be displaced completely as the first and second trenches are formed, filled, and packed and as the first and second materials are deposited as more fully described below. The bearing assembly 178 may be substantially similar to the bearing assembly 158, shown in FIGS. 3 and 4. The arm 180 is pivotally mounted to the drawbar 104, e.g., using an integral axle member (not shown). The arm 180, hence the second disc 170, is biased downwardly by its own weight or, alternatively, a spring 182. However, the arm 180 may be in rigid relation to the drawbar 104 in some embodiments. The seed deflectors 156 and 176 extend downwardly from respective tubes 154 and 174 and serve to prevent seed from bouncing out of the trench during operation. Other suitable embodiments of seed deflector mechanisms are disclosed and described in the above-referenced U.S. Pat. No. 6,386,127.

Referring to FIGS. 2, 6, and 7, the optional Packer assembly 112 includes a packer wheel 190 rotatively mounted to a first end 191 of a first packer arm 192 via an axle 193 rotating in a sleeve 194. The lateral position of the packer wheel 190 is adjusted by one or more spacers 195. In the embodiment shown in FIGS. 6 and 7, the axle 193 has a plurality of throughbores 194. A sleeve 196 with at least one aligning bore 196 is affixed to the first end 191 of the packer arm 192. The lateral position of the packer wheel 190 is adjusted by aligning one of the throughbores 194 with the bore 196 and inserting a pin or the like therethrough. A second end 198 of the first packer wheel 192, in turn, is connected to a second packer arm 199. The second packer arm 199 is pivotally attached to the drawbar 104 and may be biased downwardly by the spring 182. The second end 198 of the first packer arm 192 is also pivotally attached to the depth adjustment mechanism 114 in a manner more fully discussed infra. The packer wheel 190 may be disposed at a compound angle, the steer and tilt angles be opposite those of the first disc 150 in one embodiment.

The instant depth adjustment mechanism 114 is depicted in FIGS. 2, 4, 8, and 9 and includes a gauge wheel 200 rotatably mounted at a first end 202 of a gauge wheel arm 204. A second end 206 of the gauge wheel arm 204 is attached to a gauge wheel pivot 208. A depth gauge bracket 210 is engaged to a depth adjustment arm 212. The depth gauge bracket 210 has an arcuate, elongated slot 214. The depth adjustment arm 212 includes a depth adjustment pin 216, which is slidingly engaged in the slot 214. Correspondingly, the depth adjustment arm 212 is attached to the gauge wheel arm 204 so that the pin 216 maintains a constant arc about the gauge wheel pivot 208 as the pin 216 slides in the arcuate engaged slot 214. A depth adjustment handle 218 is mounted on the depth adjustment arm 212 so as to engage and disengage the depth adjustment arm 212 in the depth adjustment bracket 210. The depth adjustment handle 218 is pivotally mounted on the depth adjustment arm 212. Slots 220 are defined in the depth adjustment handle 218 so as to correspond to bracket piece 222 on the depth gauge bracket 210. The bracket teeth 222 operably engage the slots 220 of the handle 218 as the handle 218 is biased by a handle spring 224, which is mounted between the handle 218 and the depth adjustment arm 212. The handle 218 is mounted to the depth adjustment arm 212 at pivots 226. An alternative construction for the instant depth adjusting mechanism is disclosed and depicted in the above-referenced U.S. Pat. No. 6,386,127. The present gauge wheel can be constructed from composite elements, such as a tire rim 228 formed from metal or plastic and connected by a suitable fastener 230. A semi-pneumatic tire 232 may be disposed about the rim periphery. The tire 232 reduces compaction yet allows the gauge wheel 200 to move toward and away from the ground as the depth adjustment mechanism 114 is operated to adjust the height of the first disc 150. An optional firming wheel may be disposed, e.g., between the instant second disc and the packer assembly. One suitable firming wheel assembly is disclosed and depicted in the above-referenced U.S. Pat. No. 6,386,127.

In operation the present planter unit as a component of a planter or drill is towed over a field to be seeded. As the instant planter unit is pulled through a seedbed, the first disc 150 and scraper 152 create a first trench 240 in the soil 242 of the seedbed and a first material described above such as fertilizer granules 244 are conveyed through the tube 154 and deposited proximate the bottom of the first trench 241. Subsequently, the second disc 170 and scraper 172 (if present) create a second trench 246 which may be continuous with the first trench 240. In one embodiment, the second trench is created by shaving off a side of the first trench 240 such that a first layer of soil 248 from the side of the first trench 240 is displaced over the first material 244 and such that a shoulder 250 is formed adjacent the first trench 240. A second material, such as seed 252 is then conveyed through the second tube 174 and deposited proximate the shoulder 250 in the second trench 246. The packer wheel then displaces soil to complete filling the first trench 240, to fill the second trench 246 with a layer of soil 254 and packs the soil layers 248 and 254. In one embodiment the second material is positioned between about 0.5 and 1.0, or about 1 inch laterally and between about 0.5 and 1.5, or between about 0.75 and 1.0 inch above the second material.

Because numerous modifications of this invention may be made without departing from the spirit thereof, the scope of the invention is not to be limited to the embodiments illustrated and described. Rather, the scope of the invention is to be determined by the appended claims and their equivalents.

What is claimed is:

1. A planter unit for applying a first material and a second material into a soil, the planter unit in mechanical communication with a tool bar, the tool bar displaced by a tractor in a direction of travel, the assembly comprising:
a first disc in mechanical communication with the tool bar and angularly disposed with respect to the direction of travel, the first disc opening a first trench in the soil, said first disk includes a scraper; said scraper attached to said tool bar;
a first path formed by a first tube conveying the first material to proximate a bottom of the first trench;
a seed deflector extending downwardly and attached to said first tube;
a second disc in a non-overlapping relation with respect to the first disc and positioned to open a second trench in the soil, a bottom of the second trench disposed laterally and above the first trench bottom; and
a second path formed by a second tube conveying the second material to proximate the second trench bottom; a tab extending downwardly and attached to said second tube;
wherein said seed reflector and said tab serve to prevent said first and second material from bouncing out of said first and second trench.

2. The planter unit of claim 1, in which the second disc is positioned so that the second trench opens into the first trench.

3. The planter unit of claim 1, in which the second disc is positioned so that the first trench is at least partially filled as the first trench is opened.

4. The planter unit of claim 1, in which the second disc is positioned so that a shoulder proximate the first trench is formed as the second trench is opened.

5. The planter unit of claim 4, in which the second disc and second pathway are positioned so that the second material is conveyed proximate the shoulder.

6. The planter unit of claim 1, in which the second disc is generally planar.

7. The planter unit of claim 1, further comprising a bracket attachable to the tool bar and a drawbar pivotally attached to the bracket, the first disc in mechanical relation to the drawbar.

8. The planter unit of claim 7, further comprising means for filling and packing said first and second trenches.

9. The planter unit of claim 8, in which said filling and packing means includes a packer wheel in mechanical communication with the drawbar.

10. The planter unit of claim 1, further comprising a packer wheel positioned to at least partially displace soil into the first and second trenches.

11. The planter unit of claim 1, in which the first disc is generally planar.

12. The planter unit of claim 1, in which the second disc is generally planar.

13. The planter unit of claim 1, in which the first or second pathways are tubes.

14. The planter unit of claim 1, further comprising means for monitoring the rate of flow of the first or second materials.

15. The planter unit of claim 1, further comprising means for adjusting the depth of the first disc in the soil.

16. The planter unit of claim 1, further including a depth adjusting mechanism in mechanical communication with the first disc.

17. The planter unit of claim 16, the depth adjusting mechanism including a gauge wheel and a structure for adjusting the depth of the gauge wheel in relation to the first disc.

18. A seeding implement in combination with the planter unit of claim 1, the planter unit an operative component of the seeding implement.

* * * * *